United States Patent
Wenning et al.

(10) Patent No.: US 7,300,997 B2
(45) Date of Patent: Nov. 27, 2007

(54) HIGH-REACTIVITY POLYURETHANE POWDER COATING COMPOSITIONS BASED ON EPOXY-TERMINATED POLYADDITION COMPOUNDS CONTAINING URETDIONE GROUPS

(75) Inventors: Andreas Wenning, Nottuln (DE); Emmanouil Spyrou, Dorsten (DE)

(73) Assignee: Degussa AG, Duesseldorf (DE)

( * ) Notice: Subject to any disclaimer, the term of this patent is extended or adjusted under 35 U.S.C. 154(b) by 394 days.

(21) Appl. No.: 10/963,503

(22) Filed: Oct. 14, 2004

(65) Prior Publication Data

US 2005/0090636 A1 Apr. 28, 2005

(30) Foreign Application Priority Data

Oct. 22, 2003 (DE) .................. 103 48 966

(51) Int. Cl.
*C08G 18/79* (2006.01)
*C08G 18/80* (2006.01)
*C08G 18/42* (2006.01)
*C08G 18/48* (2006.01)
*C08G 18/20* (2006.01)
*C08G 18/22* (2006.01)

(52) U.S. Cl. ............ 528/73; 428/425.8; 427/386; 528/45; 528/52; 528/905

(58) Field of Classification Search ............ 428/425.8; 528/45, 73, 52, 905; 427/386
See application file for complete search history.

(56) References Cited

U.S. PATENT DOCUMENTS 6,914,115 B2 7/2005 Spyrou et al.

| | | | |
|---|---|---|---|
| 2002/0151670 A1* | 10/2002 | Wenning et al. | 528/44 |
| 2003/0153713 A1* | 8/2003 | Spyrou et al. | 528/48 |
| 2004/0019142 A1* | 1/2004 | Rink et al. | 524/377 |
| 2004/0219367 A1 | 11/2004 | Spyrou et al. | |
| 2005/0003206 A1 | 1/2005 | Spyrou et al. | |
| 2005/0085615 A1 | 4/2005 | Wenning et al. | |
| 2005/0090627 A1 | 4/2005 | Wenning et al. | |
| 2005/0090636 A1 | 4/2005 | Wenning et al. | |
| 2005/0096450 A1 | 5/2005 | Spyrou et al. | |
| 2005/0096451 A1 | 5/2005 | Spyrou | |
| 2005/0239956 A1 | 10/2005 | Spyrou et al. | |
| 2005/0239992 A1 | 10/2005 | Spyrou et al. | |

FOREIGN PATENT DOCUMENTS

DE 102 05 608 A1 8/2003
EP 1 063 269 A2 12/2000

OTHER PUBLICATIONS

U.S. Appl. No. 10/591,814, filed Sep. 6, 2006, Spyrou, et al.
U.S. Appl. No. 11/576,851, filed Apr. 6, 2007, Spyrou, et al.
U.S. Appl. No. 10/591,815, filed Sep. 6, 2006, Spyrou.
U.S. Appl. No. 11/576,703, filed Apr. 5, 2007, Spyrou, et al.
U.S. Appl. No. 11/722,740, filed Jun. 25, 2007, Spyrou, et al.

* cited by examiner

*Primary Examiner*—Rabon Sergent
*Assistant Examiner*—Benjamin Gillespie
(74) *Attorney, Agent, or Firm*—Oblon, Spivak, McClelland, Maier & Neustadt, P.C.

(57) ABSTRACT

Polyurethane powder coating compositions based on epoxy-terminated polyaddition compounds having uretdione groups, which cure at low baking temperatures, a process for preparing such compositions, and their use for producing plastics, especially polyurethane powder coatings, which crosslink at low baking temperatures to give high-gloss or matt, light-stable and weather-stable coating films.

19 Claims, No Drawings

HIGH-REACTIVITY POLYURETHANE POWDER COATING COMPOSITIONS BASED ON EPOXY-TERMINATED POLYADDITION COMPOUNDS CONTAINING URETDIONE GROUPS

BACKGROUND OF THE INVENTION

1. Field of the Invention

The invention relates to polyurethane powder coating compositions based on epoxy-terminated polyaddition compounds containing uretdione groups, which cure at low baking temperatures, to a process for preparing such compositions, and to the use of the compositions for producing plastics, including polyurethane powder coatings, which crosslink at low baking temperatures to give high-gloss or matt, light-stable and weather-stable coating films.

2. Description of the Related Art

Externally or internally blocked polyisocyanates which are solid at room temperature are useful as crosslinkers for thermally crosslinkable polyurethane (PU) powder coating compositions.

Thus, for example, U.S. Pat. No. 4,246,380 describes PU powder coatings having outstanding weathering stability and thermal stability. The crosslinkers whose preparation is described in U.S. Pat. No. 4,302,351 are composed of isophorone diisocyanate containing isocyanurate groups blocked with ε-caprolactam. Also known are polyisocyanates containing urethane, biuret or urea groups, the isocyanate groups of these polyisocyanates being likewise blocked.

The drawback of these externally blocked systems lies in the elimination of the blocking agent during the thermal crosslinking reaction. Since the blocking agent may thus be emitted to the environment, it is necessary on environmental and workplace safety grounds to take special precautions in order to clean the outgoing air and/or to recover the blocking agent. Moreover, the reactivity of the crosslinkers is low. Curing temperatures above 170° C. are required.

U.S. Pat. No. 4,463,154 and U.S. Pat. No. 4,483,789 describe processes for preparing polyaddition compounds which contain uretdione groups and whose terminal isocyanate groups are blocked irreversibly with monoalcohols or monoamines. A particular drawback are the chain-terminating constituents of the crosslinkers, which lead to low network densities in the PU powder coatings and hence to moderate solvent resistances.

Uretdione powder coating crosslinkers prepared by reacting polyisocyanates containing uretdione groups with diols and ester-containing and/or carbonate-functional chain extenders, or using dimer diols, are described in U.S. Pat. No. 5,621,064 and in U.S. Pat. No. 5,596,066, respectively.

Hydroxyl-terminated polyaddition compounds containing uretdione groups are subject matter of U.S. Pat. No. 6,613,861. On the basis of their functionality of two they exhibit improved resistance to solvents.

PU powder coatings based on epoxy-terminated polyaddition compounds containing uretdione groups, as are described in EP 1 063 269, possess an even substantially higher chemical resistance.

A feature common to the powder coating compositions based on these polyisocyanates containing uretdione groups is the absence of any emission of volatile compounds during the curing reaction. However the at least 180° C. baking temperatures are high.

The use of amidines as catalysts in PU powder coating compositions is described in U.S. Pat. No. 5,847,044. Although these catalysts do lead to a reduction in the curing temperature, they exhibit considerable yellowing, which is generally undesirable in the coatings sector. The cause of this yellowing is thought to be the reactive nitrogen atoms in the amidines. These are able to react with atmospheric oxygen to form N-oxides, which are responsible for the discoloration.

U.S. Pat. No. 5,847,044 also mentions other catalysts which have been used to date for this purpose, but without indicating any special effect on the cure temperature. They include the organometallic catalysts known from polyurethane chemistry, such as dibutyltin dilaurate (DBTL), or else tertiary amines, such as 1,4-diazabicyclo[2.2.2]octane (DABCO), for example.

WO 00/34355 claims catalysts based on metal acetyl acetonates: zinc acetyl acetonate, for example. Such catalysts are actually capable of lowering the curing temperature of polyurethane powder coating compositions containing uretdione groups, but their reaction products are principally allophanates (M. Gedan-Smolka, F. Lehmann, D. Lehmann "New catalysts for the low temperature curing of uretdione powder coatings" International Waterborne, High Solids and Powder Coatings Symposium, New Orleans, Feb. 21-23, 2001). Allophanates are the reaction products of one mole of alcohol and two moles of isocyanate, whereas in the conventional urethane chemistry one mole of alcohol reacts with one mole of isocyanate. As a result of the unwanted formation of allophanate, therefore, isocyanate groups valuable both technically and economically are destroyed.

DE 103 20 267, U.S. 2003/0153713, and DE 103 20 266 describe metal hydroxides, metal alkoxides, quaternary ammonium salts with hydroxides, fluorides or carboxylates, which accelerate the unblocking of uretdione groups so greatly that when using powder coating curing agents which contain uretdione groups it is possible to achieve considerable reduction in the cure temperature of powder coating compositions.

Since the activity of these catalysts decreases markedly in the presence of acids, the coatings produced from highly accelerated powder coating compositions of this kind include an acid scavenger. Acid groups are normally present in significant amounts in the polyester polyols employed. Possible examples of acid scavengers used include 2-oxazolines, which are very expensive. It is advantageous, however, to use epoxide compounds. Liquid epoxide compounds, such as diglycidyl ethers based on bisphenol A, for instance, have the drawback that they can only be used in the form of a cost-intensive solid masterbatch. Accordingly particular preference is given to solid epoxide compounds, such as triglycidyl isocyanurate (TGIC), for instance. The powder coating compositions formulated with TGIC, though, are subject to labeling requirements owing to the toxic potential of TGIC. In conventional TGIC-containing powder coating materials the crosslinking temperature is normally above 180° C.

SUMMARY OF THE INVENTION

Accordingly, in one embodiment of the invention it is an object to find safe, highly reactive polyurethane powder coating compositions containing uretdione groups that can be cured at very low temperatures and are particularly suitable for producing plastics and also high-gloss or matt, light-stable and weather-stable powder coatings.

Surprisingly it has been found that epoxy-terminated polyaddition compounds containing uretdione groups can be used as a crosslinker component for polyurethane powder coating materials that can be cured at very low baking temperatures. A particular surprise in this context is the fact that the epoxy groups react with the carboxylic acid groups in the powder coating compositions in the temperature range from 120 to 170° C.

DETAILED DESCRIPTION OF THE DRAWINGS

The present invention accordingly provides polyurethane powder coating compositions essentially comprising that may contain A) at least one epoxy-terminated polyaddition compound containing uretdione groups which has a melting point of from 40 to 130° C., a number-average molar mass of between 1,000 and 15,000, and a free isocyanate group content (calculated as NCO, molecular weight=42) of from 0 to 2% by weight;

B) at least one hydroxyl-containing polymer having a melting point of from 40 to 130° C. and an OH number of from 20 to 200 mg KOH/g;

C) at least one catalyst selected from the group consisting of metal acetylacetonates, metal hydroxides, metal alkoxides, quaternary ammonium hydroxides, quaternary ammonium fluorides, and quaternary ammonium carboxylates;

D) if desired, auxiliaries and additives, where the ratio of the two components A) and B) being such that for each hydroxyl group of component B) there is from 0.3 to 1 uretdione group of component A), and the fraction of the catalyst component C) is from 0.001 to 3% by weight of the total amount of components A) and B).

In a preferred embodiment the coating compositions contain only components A), B), C), and D) but may also contain other components such as diluents and pigments which do not significantly affect the properties of the cured coating such as thermal stability, physical properties and/or appearance.

The invention further provides a process for preparing the powder coating compositions.

The invention also provides for the use of the powder coating compositions of the invention for producing powder coatings on metal, plastic, glass, wood or leather substrates or on other heat-resistant substrates.

Likewise provided by the present invention are metal-coating compositions, particularly for automobile bodies, cycles and motorcycles, architectural components, and household appliances, wood-coating compositions, plastic-coating compositions, leather-coating compositions, and glass-coating compositions, each containing at least one a polyurethane powder coating composition comprising A) at least one epoxy-terminated polyaddition compound containing uretdione groups which has a melting point of from 40 to 130° C., a number-average molar mass of between 1,000 and 15,000, and a free isocyanate group content (calculated as NCO, molecular weight=42) of from 0 to 2% by weight;

B) at least one hydroxyl-containing polymer having a melting point of from 40 to 130° C. and an OH number of from 20 to 200 mg KOH/g;

C) at least one catalyst selected from the group consisting of metal acetylacetonates, metal hydroxides, metal alkoxides, quaternary ammonium hydroxides, quaternary ammonium fluorides, and quaternary ammonium carboxylates;

D) if desired, auxiliaries and additives, where the ratio of the two components A) and B) is such that for each hydroxyl group of component B) there is from 0.3 to 1 uretdione group of component A), and the fraction of the catalyst component C) is from 0.001 to 3% by weight of the total amount of components A) and B).

The epoxy-terminated polyaddition compounds A) containing uretdione groups may be obtained by reacting p1 a) from 40 to 84.5% by weight of at least one polyisocyanate component containing 1. at least 40% by weight of a polyisocyanate compound containing uretdione groups and having an average functionality of at least 2.0, and
2. not more than 60% by weight of at least one diisocyanate compound and/or isocyanurate compound without uretdione groups;

b) from 50 to 15% by weight of at least one compound having at least two hydroxyl groups;

c) from 10 to 0.5% by weight of at least one compound having at least one epoxide group and at least one other isocyanate-reactive functional group.

In preferred embodiments the polyisocyanate a) contains only components 1) and 2), or contains 1) and 2) together with other materials which do not affect the properties of the polyisocyanate or the coating derived therefrom.

The uretdione group-containing polyisocyanate compounds a1) may be obtained from any desired diisocyanates by catalytic dimerization of the isocyanate groups. The diiisocyanates used for preparing a1) may be aliphatic, cycloaliphatic, araliphatic and/or aromatic diisocyanates. Preferred examples are 1,6-diisocyanatohexane (HDI), 2-methylpentamethylene 1,5-diisocyanate (DI 51), 2,2,4(2, 4,4)-trimethylhexamethylene diisocyanate, 4,4'-diisocyanatodicyclohexylmethane, 1,3 and 1,4-diisocyanatocyclohexane, isophorone diisocyanate (IPDI), diphenylmethane 2,4' and/or 4,4'-diisocyanate, xylylene diisocyanate or 2,4 and 2,6-tolylene diisocyanate, and any desired mixtures of these isomers, it being possible for these diisocyanates to be used alone or in mixtures in order to prepare component a1). The polyisocyanate compounds a1) containing uretdione groups can also be mixed with one another as desired and used for component a1).

Catalysts suitable for the preparation of component a1) from the above-mentioned diisocyanates may be in principle all known compounds which catalyze the dimerization of isocyanate groups. Examples include tertiary organic phosphines (U.S. Pat. No. 4,614,785, DE 19 34 763, and U.S. Pat. No. 4,994,541), tris(dialkylamino)phosphines (U.S. Pat. No. 4,476,054, U.S. Pat. No. 4,668,780, and U.S. Pat. No. 4,929,724), substituted pyridines (DE 10 81 895 and U.S. Pat. No. 4,912,210), and substituted imidazoles or benzimidazoles (U.S. Pat. No. 5,329,003) (each of which is incorporated herein by reference).

Preferred polyisocyanate compounds a1) include polyisocyanates containing uretdione groups which are prepared from diisocyanates that may have aliphatically and/or cycloaliphatically attached isocyanate groups.

Particular preference is given to using the uretdiones of isophorone diisocyanate (IPDI) and of 1,6-diisocyanatohexane (HDI).

The isocyanurate-free uretdione of isophorone diisocyanate may be of high viscosity at room temperature, at more than 106 mPa s; at 60° C. the viscosity may be $13 \times 10^3$ mPa s, and at 80° C. it may be $1.4 \times 10^3$ mPa s. The free NCO content may be between 16.8% and 18.5% by weight, which is to say that there may be more or less high fractions of IPDI polyuretdione in the reaction product. The monomer content may be 1% by weight. The total NCO content of the reaction product after heating at from 180 to 200° C. may be from 37.5% to 37.8% by weight.

The dimerization of aliphatic diisocyanates using processes and catalysts that are known per se may be accompanied by the formation of isocyanurate as byproduct in varying amounts, so that the NCO functionality of the polyisocyanate compounds a1) used is at least 2.

The diisocyanates a2) may include the diisocyanates indicated described above as suitable for preparing component a1). They may account for up to 60% by weight based on the total weight of components a1) and a2). Suitable mixtures include, for example, solutions of uretdiones in diisocyanates, such as are obtained following catalytic dimerization without removal of the unreacted diisocyanate.

The isocyanurates a2) may be trimers of the diisocyanates that may also be used to prepare the polyisocyanate compounds a1) containing uretdione groups. The isocyanurates may be added separately to the polyisocyanate compound a1), or as a mixture with the polyisocyanate compound a1) since they may be formed in part as a byproduct during the dimerization of diisocyanates.

Suitable compounds b) include all diols which are normally used in PU chemistry and have a molecular weight of at least 62. Examples that may be mentioned include ethylene glycol, triethylene glycol, butane-1,4-diol, pentane-1,5-diol, hexane-1,6-diol, 3-methylpentane-1,5-diol, neopentyl glycol, 2,2,4(2,4,4)-trimethylhexanediol, and neopentyl glycol hydroxypivalate. They may be used alone or in mixtures.

Also suitable as compounds b) are diols containing further functional groups. These compounds include conventional linear hydroxyl-containing polyesters, polycarbonates, polycaprolactones, polyethers, polythioethers, polyester amides, polyurethanes or polyacetals. They preferably have a number-average molecular weight of from 134 to 3,500. Preference is given to linear hydroxyl-containing polyesters (e.g., polyester polyols) or to mixtures of such polyesters. They are prepared, for example, by reacting diols with substoichiometric amounts of dicarboxylic acids, corresponding dicarboxylic anhydrides, corresponding dicarboxylic esters of lower alcohols, lactones, or hydroxycarboxylic acids.

Diols suitable for preparing the polyester polyols, in addition to those mentioned above, include 2-methylpropanediol, 2,2-dimethylpropanediol, diethylene glycol, dodecane-1,12-diol, 1,4-cyclohexanedimethanol, and 1,2 and 1,4-cyclohexanediol.

Dicarboxylic acids or derivatives thereof suitable for preparing the polyester polyols may be aliphatic, cycloaliphatic, aromatic and/or heteroaromatic in nature and may, where appropriate, be substituted, by halogen atoms for example, and/or may be unsaturated.

The preferred dicarboxylic acids or derivatives thereof include succinic, adipic, suberic, azelaic, and sebacic acid, 2,2,4(2,4,4)-trimethyladipic acid, phthalic acid, phthalic anhydride, isophthalic acid, terephthalic acid, dimethyl terephthalate, tetrahydrophthalic acid, maleic acid, maleic anhydride, and dimeric fatty acids.

Suitable polyester polyols include those that may be obtained by ring opening of lactones, such as ε-caprolactone, and simple diols as starter molecules.

The diols and dicarboxylic acids and derivatives thereof that are used to prepare the polyester polyols may be used in any desired mixtures.

Compounds c) may preferably carry at least one functional group in addition to an epoxide group, such as carboxyl, hydroxyl, mercapto or amino group, for example, capable of reaction with an isocyanate group. Particular preference is given to 2,3-epoxy-1-propanol and epoxidized soybean oil.

The epoxy-terminated polyaddition compounds A) containing uretdione groups are preferably solid below 40° C. and liquid above 130° C. and have number-average molar masses of between 1,000 and 15,000 such as those described in EP 1 063 269. In addition to the diols mentioned therein and exemplified above it is also possible to use dodecane-1,12-diol or dimer diols, for example. Using polyols is a further possibility. Thus, for example, trimethylolpropane, ditrimethylolpropane, trimethylolethane, hexane-1,2,6-triol, butane-1,2,4-triol, tris(β-hydroxyethyl)isocyanurate, pentaerythritol, mannitol or sorbitol may be used. As diols or polyols having further functional groups it is possible to use conventional hydroxyl-containing polyesters, polycaprolactones, polycarbonates, polyethers, polythioethers, polyesteramides, polyurethanes, polycaprolactams or polyacetals. Particular advantage attaches to the use of polyesters and polycaprolactones.

In the case of the hydroxyl-containing polymers B) it is preferred to use polyesters, polyethers, polyacrylates, polyurethanes and/or polycarbonates having an OH number of from 20 to 200 (in mg KOH/gram). Particular preference is given to using polyesters having an OH number of from 30 to 150, a number-average molecular weight of from 500 to 6,000 g/mol, and a melting point of between 40 and 130° C. Such binders have been described in, for example, EP 0 669 354 and EP 0 254 152 (each of which is incorporated by reference herein). It will be appreciated that mixtures of such polymers can also be employed. The amount of the hydroxyl-containing polymers may be chosen such that for each hydroxyl group of the polymer there is from 0.3 to 1 uretdione group of the polyaddition compound of the invention that contains uretdione groups.

Catalysts C) which may be used for accelerating the crosslinking reaction of the polyaddition compound of the invention, containing uretdione groups, with the hydroxyl-containing polymer include metal acetylacetonates, metal hydroxides, metal alkoxides or quaternary ammonium salts with hydroxides, fluorides or carboxylates. They are described in, for example, WO 00/34355, DE 103 20 267, US 2003/0153713, and DE 103 20 266 (each of which is incorporated by reference herein). Examples include zinc acetyl acetonate, lithium isopropoxide, tetraalkylammonium hydroxide, tetraalkylammonium fluoride and tetraalkylammonium benzoate.

The fraction of the catalyst as a proportion of the total amount of the polyurethane powder compositions of the invention is preferably from 0.001% to 3% by weight.

The activity of these catalysts drops sharply in the presence of acids. Conventionally polyaddition compounds containing uretdione groups may be prepared from hydroxyl-containing polyesters. Because of the way in which these polyesters are prepared they may normally carry acid groups to a significant extent. The acid group content of the polyesters should be below 20 mg KOH/g since otherwise the catalysts will be excessively inhibited. In the presence of such polyesters which carry acid groups it is advantageous to use the polyaddition compounds which contain uretdione groups and whose terminal epoxide groups are capable of scavenging the acid groups. This removes the need to use not only expensive catalysts in excess, relative to the acid groups, but also costly and/or toxic acid scavengers. Although the crosslinking effect of the epoxide groups in the polyaddition compounds containing uretdione groups is unwanted owing to its upward effect on viscosity, it does not generally cause any disruption, owing to the low concentration. In fact, on the contrary, an improvement in the resistance of the coatings toward chemicals or outdoor weathering may be expected.

For preparing the powder coating materials it is possible to add auxiliaries and additives like leveling agents which are customary in powder coating technology, examples include polysilicones or acrylates, light stabilizers, such as sterically hindered amines, or other auxiliaries, as described in EP 0 669 353, for example, in a total amount of from 0.05% to 5% by weight. Fillers and pigments, such as titanium dioxide, may be added in an amount up to 50% by weight of the total composition.

Optionally it is possible for additional catalysts such as those known in polyurethane chemistry to be present. These include primarily organometallic catalysts, such as dibutyltin dilaurate (DBTL), and tertiary amines, such as 1,4-diazabicyclo[2.2.2]octane, for example, in amounts of from 0.001% to 1% by weight.

All of the constituents for preparing the powder coating composition may be homogenized in simple apparatus, such as a heatable kneading apparatus, for example, but are preferably homogenized by extrusion in which case an upper temperature limits of 120 to 130° C. is preferably not exceeded. After cooling to room temperature and appropriate comminution, the extruded mass may be ground to give a ready-to-spray powder. This powder can be applied to suitable substrates by known techniques including for example electrostatic powder spraying and/or fluid-bed sintering with or without electrostatic assistance. Powder application may be followed by heating of the coated workpieces to cure at a temperature of from 120 to 220° C. for from 4 to 60 minutes, preferably from 120 to 180° C. for from 6 to 30 minutes.

The low-temperature-curing powder coating compositions of the invention are generally cured at temperatures of from 120 to 160° C. Their use allows not only the saving of energy and (cure) time but also the coating of many temperature-sensitive substrates which at temperatures of 180° C. or above would exhibit unwanted yellowing, decomposition and/or embrittlement phenomena. Besides metal, glass, wood, leather, plastics, and MDF board, certain aluminum substrates as well may be used for this application. In the case of the latter substrates, too high a temperature load may occasionally lead to an unwanted change in crystal structure. Low-temperature-curing powder coating compositions of the prior art, however, have the problem that they have to use expensive and/or toxic acid scavengers in order to bind the catalyst-deactivating acid groups in the hydroxyl-containing polymer. In the polyurethane powder coating compositions of the invention, which are curable at very low temperatures, there is no need for such scavengers. The powder coatings produced from the powder coating compositions are of high gloss or matt, are light-stable and weather-stable, and exhibit effective leveling.

The subject matter of the invention is illustrated below with reference to examples which are not intended to further limit the invention.

EXAMPLES

I. Preparation of the Epoxy-Terminated Polyaddition Compound Containing Uretdione Groups General Preparation Procedure The diol or polyol, epoxy component, and catalyst (dibutyltin dilaurate) were charged to a reactor and dissolved in a solvent. With vigorous stirring under an inert gas atmosphere the calculated amount of isophorone diisocyanate uretdione, in solution in a solvent, was added at a rate such that the reaction temperature does not exceed 100° C. The reaction is monitored by titrimetric determination of NCO and was complete after 1 to 3 hours. Thereafter the solvent was removed and the product was cooled and, where appropriate, comminuted.

TABLE 1

Polyaddition compounds containing glycidyl and uretdione groups

| | Composition | | | Chemical and physical data | | | | |
|---|---|---|---|---|---|---|---|---|
| Example No. | IPDI uretdione [mol] | Diol/polyol [mol] | Epoxide [mol] | free NCO [wt. %] | total NCO [wt. %] | EP content [wt. %] | Melting range [° C.] | Tg [° C.] |
| 1 | 4 | 3.0 DDDL | 2.0 Gy | 0.3 | 14.8 | 2.5 | 108-111 | 69 |
| 2 | 6 | 4.0 Pripol 2033[1)] | 4.0 Gy | <0.1 | 10.7 | 3.4 | 65-68 | 38 |
| 3 | 7 | 4.5 Capa 2054[2)] | 5.0 Gy | <0.1 | 10.7 | 3.3 | 47-50 | 17 |
| Comparative | VESTAGON BF 1320[3)] | | — | <0.3 | 13.0-14.5 | 0 | 90-115 | >70 |

[1)]Dimer diol from Unichema
[2)]Polycaprolactone from Solvay
[3)]Powder coating hardener from Degussa AG
The abbreviations in Table 1 have the following meanings:
DDDL: dodecane-1,12-diol
P: pentane-1,5-diol
Gy: 2,3-epoxy-1-propanol
EP: epoxide
Tg: glass transition temperature II. Polyurethane Powder Coating Materials General Preparation Procedure The ground products—polyaddition compound containing uretdione groups, polyester, catalyst, leveling agent, and white pigment—were mixed thoroughly in an edge runner mill and then homogenized in an extruder at from 80 to 140° C. After cooling, the extrudate was fractionated and ground with a pinned disk mill to a particle size<100 μm. The powder thus produced was applied to degreased, optionally pretreated iron panels using an electrostatic powder spraying unit at 60 kV, and the panels were baked at 160° C. in a forced-air drying cabinet for 30 minutes.

| Ingredients | Product description, manufacturer |
| --- | --- |
| Examples 1 to 3 | epoxy-terminated polyaddition compound containing uretdione groups |
| VESTAGON BF 1320 | powder coating crosslinker, Degussa AG, Coatings & Colorants, uretdione content: 13.0%-14.5% |
| ALFTALAT AN 739 | OH polyester, OH number: 55-60; AN: 2-6; UCB |
| ARALDIT PT 810 | triglycidyl ether isocyanurate (TGIC), Vantico |
| KRONOS 2160 | titanium dioxide, Kronos |
| RESIFLOW PV 88 | leveling agent, Worlee-Chemie |
| TBAB | tetrabutylammonium benzoate, Aldrich |

OH number: consumption of mg KOH/g polymer; AN: acid number, consumption in mg KOH/g polymer Powder coating compositions (amounts in % by weight):

| Examples | Crosslinker | ALFTALAT AN 739 | TBAB | PT 810 |
| --- | --- | --- | --- | --- |
| 1 | 20.29 Example 1 | 48.25 | 0.46 | — |
| 2 | 25.22 Example 2 | 43.37 | 0.41 | — |
| 3 | 25.22 Example 3 | 43.37 | 0.41 | — |
| C* | 20.13 VESTAGON BF 1320 | 46.92 | 0.45 | 1.5 |

*noninventive, comparative example with toxic Araldit PT 810

Used additionally in each of the formulations was 30.0% by weight of KRONOS 2160 and 1.0% by weight of RESIFLOW PV 88.

Results of curing after 30 minutes at 160° C:

| Examples | Erichsen cupping [mm] | Ball impact direct/indirect [inch · lb] | Leveling |
| --- | --- | --- | --- |
| 1 | >10.0 | >80/60 | 6 |
| 2 | 10.0 | 70/20 | 4 |
| 3 | >10.0 | >80/80 | 7 |
| C* | >10.0 | >80/70 | structure |

*noninventive, comparative example with toxic Araldit PT 810

Erichsen cupping to DIN 53 156
Ball impact to ASTM D 2794-93
Leveling to PCI (1 to 10, 1 very poor, 10 very good)
German application 10348966.5 filed on Oct. 22, 2003 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. A polyurethane powder coating composition comprising
A) at least one epoxy-terminated polyaddition compound having one or more uretdione groups which has a melting point of from 40 to 130° C., a number-average molar mass of between 1,000 and 15,000, and a free isocyanate group content calculated as NCO with a molecular weight=42 of from 0 to 2% by weight;
B) at least one hydroxyl-containing polymer having a melting point of from 40 to 130° C. and an OH number of from 20 to 200 mg KOH/g; and
C) at least one catalyst selected from the group consisting of a metal acetylacetonate, a metal hydroxide, a metal alkoxide, a quaternary ammonium hydroxide, a quaternary ammonium fluoride, and a quaternary ammonium carboxylate;
wherein from 0.3 to 1 uretdione group of component A) are present for each hydroxyl group of component B), and
the catalyst C) is present in an amount of from 0.001 to 3% by weight based on the total amount of components A) and B).

2. The polyurethane powder coating composition as claimed in claim 1, wherein the epoxy-terminated polyaddition compound having uretdione groups A) comprises reacted amounts of
a) from 40 to 84.5% by weight of at least one polyisocyanate component comprising reacted components of
1. at least 40% by weight of at least one polyisocyanate compound having one or more uretdione groups and having an average functionality of at least 2.0, and
2. not more than 60% by weight of at least one diisocyanate compound or isocyanurate compound without uretdione groups;
b) from 50 to 15% by weight of at least one compound having at least two hydroxyl groups;
c) from 10 to 0.5% by weight of at least one compound having at least one epoxide group and at least one other isocyanate-reactive functional group;
wherein the polyaddition compound is solid below 40° C. and liquid above 130° C. and has a number-average molar mass of between 1,000 and 15,000 and a free isocyanate group content calculated as NCO with a molecular weight=42 of from 0% to 2% by weight.

3. The polyurethane powder coating composition as claimed in claim 2 wherein the polyisocyanate compound having uretdione group a1) comprises reacted units of at least one of 1,6-diisocyanatohexane, 2-methylpentamethylene 1,5-diisocyanate, 2,2,4(2,4,4)-trimethylhexamethylene diisocyanate, 4,4'-diisocyanatodicyclohexylmethane, 1,3-diisocyanatocyclohexane, 1,4-diisocyanatocyclohexane, or isophorone diisocyanate.

4. The polyurethane powder coating composition as claimed in claim 2, wherein a2) is at least one selected from the group consisting of 1,6-diisocyanatohexane, 2-methylpentamethylene 1,5-diisocyanate, 2,2,4(2,4,4)-trimethylhexamethylene diisocyanate, 4,4'-diisocyanatodicyclohexylmethane, 1,3-diisocyanatocyclohexane, 1,4-diisocyanatocyclohexane, and isophorone diisocyanate (IPDI).

5. The polyurethane powder coating composition as claimed in claim 2, wherein the compound having at least two hydroxyl groups b) is at least one selected from the group consisting of ethylene glycol, triethylene glycol, butane-1,4-diol, pentane-1,5-diol, hexane-1,6-diol, 3-methylpentane-1,5-diol, neopentyl glycol, 2,2,4(2,4,4)-trimethylhexanediol, and neopentyl glycol hydroxypivalate.

6. The polyurethane powder coating composition as claimed in claim 2, wherein the compound having at least two hydroxyl groups b) is at least one selected from the group consisting of a linear hydroxyl-containing polyester, a polycarbonate, a polycaprolactone, a polyether, a polythioether, a polyesteramide, a polyurethane, and a polyacetal.

7. The polyurethane powder coating composition as claimed in claim 2, wherein component c) is at least one of 2,3-epoxy-1-propanol or an epoxidized soybean oil.

8. The polyurethane powder coating composition as claimed in claim 1, comprising at least one of a polyester, a polyether, a polyacrylate, a polyurethane, or a polycarbonate.

9. The polyurethane powder coating composition as claimed in claim 1, comprising at least one of zinc acetylacetonate, lithium isopropoxide, tetraalkylammonium hydroxide, tetraalkylammonium fluoride or tetraalkylammonium benzoate.

10. The polyurethane powder coating composition as claimed in claim 1, further comprising at least one additive or auxiliary D) selected from the group consisting of a leveling agent, a light stabilizer, a filler, an additional catalyst and a pigment.

11. A process for preparing a polyurethane powder coating composition comprising
mixing at least A), B), and C) in a heatable apparatus at a temperature of no more than 130° C.,
A) at least one epoxy-terminated polyaddition compound having one or more uretdione groups which has a melting point of from 40 to 130° C., a number-average molar mass of between 1,000 and 15,000, and a free isocyanate group content calculated as NCO with a molecular weight=42 of from 0 to 2% by weight;
B) at least one hydroxyl-containing polymer having a melting point of from 40 to 130° C. and an OH number of from 20 to 200 mg KOH/g; and
C) at least one catalyst selected from the group consisting of a metal acetylacetonate, a metal hydroxide, a metal alkoxide, a quaternary ammonium hydroxide, a quaternary ammonium fluoride, and a quaternary ammonium carboxylate;
wherein from 0.3 to 1 uretdione group of component A) are present for each hydroxyl group of component B), and the catalyst C) is present in an amount of from 0.001 to 3% by weight based on the total amount of A) and B).

12. A method comprising
applying a polyurethane powder a coating composition to a substrate and then curing the coating composition present on the susbstrate;
wherein the coating composition comprises
A) at least one epoxy-terminated polyaddition compound having one or more uretdione groups which has a melting point of from 40 to 130° C., a number-average molar mass of between 1,000 and 15,000, and a free isocyanate group content calculated as NCO with a molecular weight=42 of from 0 to 2% by weight;
B) at least one hydroxyl-containing polymer having a melting point of from 40 to 130° C. and an OH number of from 20 to 200 mg KOH/g; and
C) at least one catalyst selected from the group consisting of a metal acetylacetonate, a metal hydroxide, a metal alkoxide, a quaternary ammonium hydroxide, a quaternary ammonium fluoride, and a quaternary ammonium carboxylate;
wherein from 0.3 to 1 uretdione group of component A) is present for each hydroxyl group of component B), and the catalyst C) is present in an amount of from 0.001 to 3% by weight based on the total amount of components A) and B),
to form a coating on a substrate.

13. The method as claimed in claim 12 wherein the substrate is metal, plastic, wood, glass, or leather.

14. The polyurethane powder coating composition of claim 1, consisting essentially of components A), B) and C).

15. The process as claimed in claim 11, wherein the mixing is carried out at a temperature of no greater than 120° C.

16. The polyurethane powder coating composition of claim 1, in the form of a powder having a particle size of less than 100 μm.

17. The polyurethane powder coating composition of claim 1, wherein the epoxy-terminated polyaddition compound A) has a uretdione content of from 5 to 15% by weight based on the weight of A).

18. A coated substrate obtained by the process as claimed in claim 12.

19. The method of claim 12, wherein curing is carried out by heating at a temperature of from 120° C. to 160° C.

* * * * *